United States Patent [19]
Jacobs et al.

[11] Patent Number: 5,936,857
[45] Date of Patent: Aug. 10, 1999

[54] POWER CONVERTER HAVING MULTIPLE OUTPUT VOLTAGE CAPABILITY

[75] Inventors: Mark E. Jacobs; Hengchun Mao, both of Dallas, Tex.

[73] Assignee: Lucent Technologies Inc., Murray Hill, N.J.

[21] Appl. No.: 08/935,388

[22] Filed: Sep. 23, 1997

[51] Int. Cl.$^6$ .................................................. H02M 7/06
[52] U.S. Cl. ............................. 363/100; 363/17; 363/48; 363/126
[58] Field of Search ................................ 363/15, 16, 17, 363/44, 45, 47, 48, 63, 100, 126

[56] References Cited

U.S. PATENT DOCUMENTS

| | | | |
|---|---|---|---|
| 3,171,078 | 2/1965 | Keener | 363/48 |
| 3,694,731 | 9/1972 | Cherry | 363/100 |
| 3,731,179 | 5/1973 | Rademaker | 363/63 |
| 3,921,055 | 11/1975 | Dorsey | 363/100 |
| 4,922,397 | 5/1990 | Heyman | 363/17 |
| 5,172,308 | 12/1992 | Tohya | 363/126 |
| 5,793,626 | 9/1998 | Jiang | 363/126 |

*Primary Examiner*—Jeffrey Sterrett

[57] ABSTRACT

For use in a power converter having first and second output diodes coupled to a secondary winding of an isolation transformer and first and second output inductors, coupled to the first and second output diodes, respectively, and an output derived from the first and second output inductors and a center tap of the secondary winding, a circuit for, and method of allowing the power converter to provide an output current at multiple output voltages. In one embodiment, the circuit includes: (1) a contactor, coupled to a first node between the first output diode and output inductor and a second node between the second output diode and output inductor, that selectively: (1a) closes to create an inter-inductor conductive path to couple the first and second output inductors in parallel and to allow the power converter to operate at a first output voltage and (1b) opens to break the inter-inductor conductive path and to allow the power converter to operate at a second output voltage lower than the first output voltage and (2) first and second conductive paths, coupling the center tap to the first node and the second node, respectively, that provide conductive paths for the output current.

18 Claims, 2 Drawing Sheets

POWER CONVERTER HAVING MULTIPLE OUTPUT VOLTAGE CAPABILITY

TECHNICAL FIELD OF THE INVENTION

The present invention is directed, in general, to power conversion and, more specifically, to a power converter that is reconfigurable to provide a selected one of multiple output voltages and a method of operating a power converter to allow it to provide such selected one.

BACKGROUND OF THE INVENTION

The traditional reliability of telecommunications systems that users have come to rely upon is due largely to the systems' use of highly reliable and redundant power systems. Power systems used in telecommunications applications typically consist of a DC power supply that converts commercial alternating current (AC) power into direct current (DC) power for use by the telecommunications system. To be suitable for use in many different countries, the DC power supply must be compatible with a wide range of voltages and frequencies. Commercial power in Europe, for example, is supplied at 220 VAC, 50 Hz. In the United States, however, a standard voltage is 120 VAC, 60 Hz. In addition, brownouts may significantly reduce line voltages and, conversely, lighter loads, particularly at night, may cause the line voltages to increase. Accordingly, power supplies are typically designed to operate with frequencies between 47 and 63 Hz, and with voltages ranging from 85 VAC to as high as 265 VAC (commonly known as "universal input").

The DC power supply converts this AC voltage to a DC voltage required by telecommunications equipment contained in a particular telecommunications system. The DC power supply generally includes an electromagnetic interference (EMI) filter, a power factor correction circuit and a DC/DC power converter. The EMI filter is employed to ensure compliance with EMI standards. The power factor correction circuit converts commercial AC power to a DC voltage, for instance, 400 VDC. The DC/DC power converter then scales the high DC voltage down to a lower voltage as required by a board-mounted power supply (BMP) within the telecommunications equipment.

Telecommunications equipment typically operate on one of two voltages: +24 VDC or −48 VDC. Wireless equipment, for instance, often require +24 VDC. Central office equipment, however, typically require −48 VDC. Telecommunications power supplies are, therefore, designed for either +24 VDC or −48 VDC operation.

To maintain high availability of the telecommunications system, the power supplies are used in the power systems in a redundant configuration. Seamless operations of the telecommunications system is assured, even if one DC power supply fails. The failed DC power supply must immediately be replaced, however, to maintain redundancy and avoid future loss of service. Service providers, therefore, must have an inventory of power supplies available for immediate placement in the system. Because of the different voltage requirements of the telecommunications equipment, service providers are currently forced to maintain in reserve both types of power supplies. It would be advantageous, for multiple reasons (such as reduced development efforts and cost of manufacturing), to inventory only one type of DC power supply.

Accordingly, what is needed in the art is a DC power supply capable of providing multiple output voltages (e.g., +24 VDC or −48 VDC), as required by the system it powers.

SUMMARY OF THE INVENTION

To address the above-discussed deficiencies of the prior art, the present invention provides, for use in a power converter having first and second output diodes coupled to a secondary winding of an isolation transformer and first and second output inductors, coupled to the first and second output diodes, respectively, and an output derived from the first and second output inductors and a center tap of the secondary winding, a circuit for, and method of allowing the power converter to provide an output current at to multiple output voltages. In one embodiment, the circuit includes: (1) a contactor, coupled to a first node between the first output diode and output inductor and a second node between the second output diode and output inductor, that selectively: (1a) closes to create an inter-inductor conductive path to couple the first and second output inductors in parallel and to allow the power converter to operate at a first output voltage and (1b) opens to break the inter-inductor conductive path and to allow the power converter to operate at a second output voltage lower than the first output voltage and (2) first and second conductive paths, coupling the center tap to the first node and the second node, respectively, that provide conductive paths for the output current.

The present invention therefore introduces the broad concept of providing a power converter having alternative operating modes in which power derived from the isolation transformer is either summed or not summed in a pair of output inductors. The power converter is therefore capable of producing multiple output voltage levels. "Contactor," for purposes of the present invention, is broadly defined as anything capable of selectively establishing a conductive path from one location to another. "Contactor" therefore includes a wide array of devices, such as solid state switches (such as transistors), relays, jumpers, wires, soldered connections and the like. The contactor of the illustrated embodiment is most typically called upon to transition between conductive and nonconductive states only occasionally, making or breaking a conductive path relatively infrequently.

In one embodiment of the present invention, the first and second conductive paths each include a freewheeling diode. Of course, the freewheeling diodes are not necessary for the broad scope of the present invention.

In one embodiment of the present invention, the power converter further comprises an inverter coupled to a primary winding of the isolation transformer. Those skilled in the art are familiar with invertors and their operation.

In one embodiment of the present invention, the power converter further comprises an output capacitor coupled across the output of the power converter. The output capacitor smooths the output voltage level of the power converter.

In one embodiment of the present invention, the first output voltage is about 48 volts and the second output voltage is about 24 volts. As set forth above, these output voltage levels are employed to advantage by telecommunications equipment. The principles of the present invention, however, apply to power converters capable of providing other output voltages.

In one embodiment of the present invention, the first and second output inductors share a common core. Ripple current in the power converter can be reduced by providing a common core. However, the present invention does not require a common core.

In one embodiment of the present invention, the power converter further comprises a snubber circuit coupled to the secondary winding of the isolation transformer. Those skilled in the art are familiar with the structure and operation of snubber circuits.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
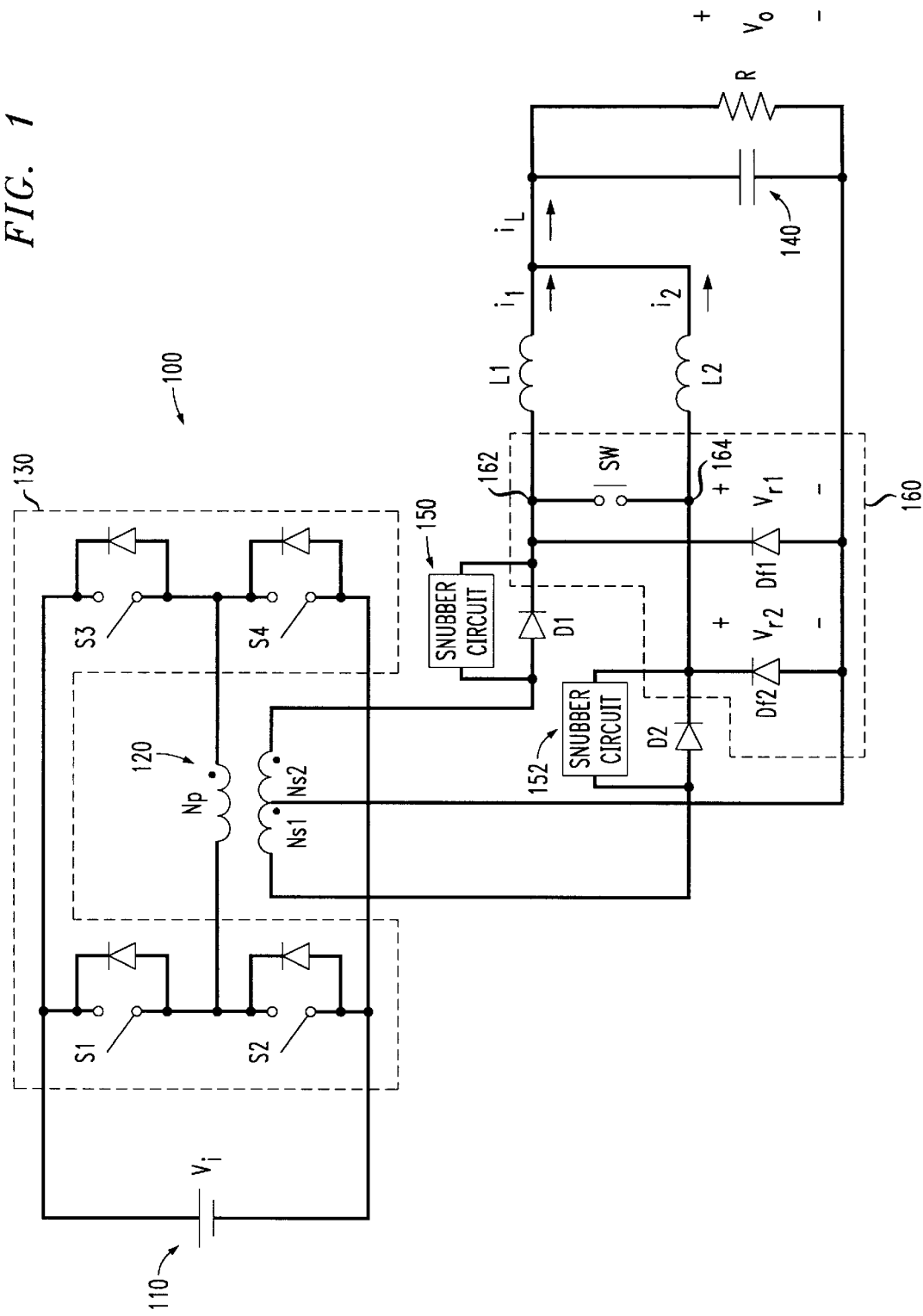
FIG. 1 illustrates an embodiment of a full bridge power converter constructed according to the principles of the present invention.

Referring initially to FIG. 1 illustrated is an embodiment of a full bridge power converter 100 constructed according to the principles of the present invention. The power converter 100 has an input coupled to an input source of electrical power 110 with an input voltage Vi and a DC output coupled to an electrical load R. The power converter 100 includes an isolation transformer 120 having a primary winding Np and two secondary windings Ns1, Ns2. The power converter 100 further includes an inverter 130 coupling the input voltage Vi to the primary winding Np. The inverter 130 consists of first, second, third, and fourth switches S1, S2, S3, S4 that alternately conduct current in pairs, thereby providing AC power to the isolation transformer 120. Invertors 130 are well known in the art and, as a result, will not be described in detail.

The power converter 100 further includes first and second output diodes D1, D2, coupled to the secondary windings Ns1, Ns2. The power converter 100 further includes first and second output inductors L1, L2 coupled to the first and second diodes D1, D2, respectively. The DC output of the power converter 100 is derived from the first and second output inductors L1, L2 and a center tap of the secondary windings Ns1, Ns2. The power converter 100 further includes an output capacitor 140 coupled across the DC output. The power converter 100 also includes snubber circuits 150, 152, coupled to the secondary windings Ns1, Ns2 of the isolation transformer 120 and across the first and second diodes D1, D2, respectively. Snubber circuits such as RCD snubber circuits are well known in the art and, as a result, a detailed discussion is not included herein. Of course, the output capacitor 140 and the snubber circuits 150, 152 are not required by the present invention.

The power converter 100 further includes a circuit 160 that allows the power converter 100 to provide an output at multiple output voltages. The circuit 160 includes a contactor SW, coupled to a first node 162 between the first output diode D1 and the first output inductor L1 and a second node 164 between the second output diode D2 and the second output inductor L2. The contactor SW selectively closes to create an inter-inductor conductive path to couple the first and second output inductors L1, L2 in parallel and to allow the power converter 100 to operate at a first output voltage. Alternatively, the contactor SW opens to break the inter-inductor conductive path and to allow the power converter 100 to operate at a second output voltage lower than the first output voltage. The circuit 160 further includes first and second conductive paths, coupling the center tap to the first node 162 and the second node 164, respectively. In a preferred embodiment, the first and second conductive paths include first and second freewheeling diodes Df1, Df2, respectively.

The power converter 100 operates in two alternative modes, a full-voltage mode and a reduced-voltage mode. In the full-voltage mode, the contactor SW is closed. The inter-inductor conductive path is thereby created, coupling the first and second output inductors L1, L2 in parallel. The operation of the power converter 100 is thus analogous to that of a conventional full-bridge power converter.

The switches of the inverter 130 alternately conduct current to apply the input voltage Vi to the isolation transformer 120. During a first interval, for a first duty cycle D, the inverter 130 switches to apply a positive voltage across the isolation transformer 120. The first diode D1 conducts and first and second inductor currents I1, I2 increase. During a second interval, for a second duty cycle 1-D, the voltage applied across the isolation transformer 120 is substantially zero. The first and second inductor currents I1, I2 decrease during this interval. Then, during a third interval, for the first duty cycle D, the inverter 130 applies a negative voltage across the isolation transformer 120. The second diode D2 now conducts. Since the inductors are in the parallel configuration, the first and second inductor currents I1, I2 again increase. During a fourth interval, for a second duty cycle 1-D, the substantially zero voltage is again applied across the isolation transformer 120. The first and second inductor currents I1, I2, therefore, again decrease during this interval.

The parallel configuration of the inductors thus allow the first and second inductor currents I1, I2 to increase when the voltage across the isolation transformer 120 is either negative or positive. The first and second inductors, L1, L2, therefore see two positive voltage pulses throughout a complete switching cycle, allowing the power converter 100 to provide a full voltage output in the full-voltage mode.

Alternatively, the power converter 100 may be operated in a reduced-voltage mode. The contactor SW opens, breaking the inter-inductor conductive path. The reduced-voltage mode functions as follows. The switches of the inverter 130 alternately conduct current to apply the input voltage Vi to the isolation transformer 120. During the first interval, for the first duty cycle D, the inverter 130 applies the positive voltage across the isolation transformer 120. The first diode D1 and the second freewheeling diode Df2 conduct current, as the first inductor current I1 increases while the second inductor current I2 decreases. During the second interval, for the second duty cycle 1-D, the voltage applied across the isolation transformer 120 is substantially zero. The second diode D2 and the first freewheeling diode Df1 turn on, allowing current to freewheel through the conductive paths. Both the first and second inductor currents I1, I2 decrease during the second interval. Then, during the third interval, for the first duty cycle D, the inverter 130 applies the negative voltage across the isolation transformer 120. The first diode D1 and the second freewheeling diode Df2 turn off. The second diode D2 and the first freewheeling diode Df1 are on and the second inductor current increases. During this interval, the first inductor current is still decreasing. Finally, during the fourth interval, for a duty cycle 1-D, the voltage applied across the isolation transformer 120 is substantially zero. The first diode D1 and the second freewheeling diode Df1 turn on, allowing current to freewheel through the conductive paths. Each of the first and second output inductors L1, L2, therefore sees only one positive voltage pulse in a switching cycle. The power converter 100 thus provides only half the voltage output in the reduced-voltage mode.

Figure 2:
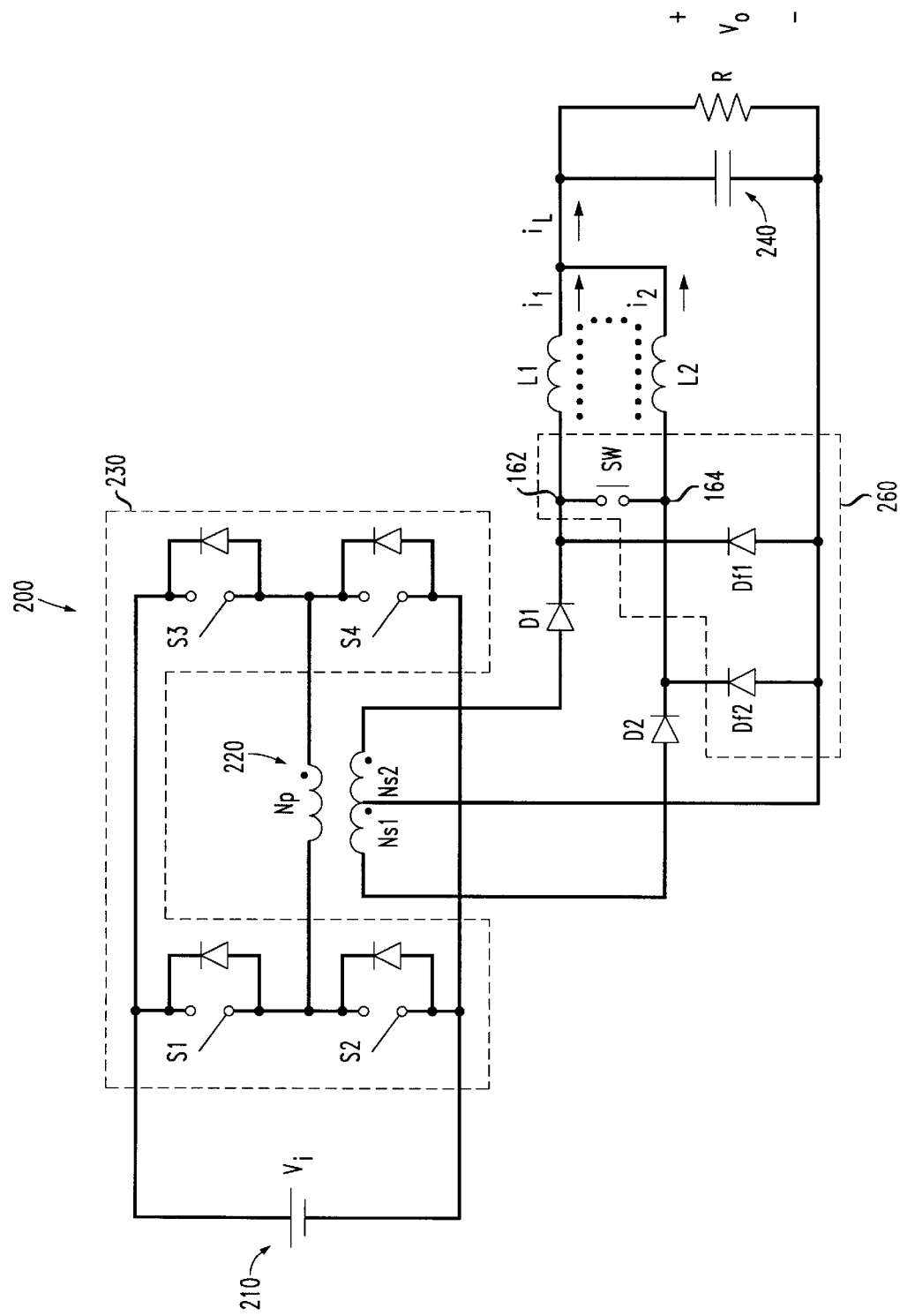
FIG. 2 illustrates another embodiment of a full bridge power converter constructed according to the principles of the present io invention.

Turning now to FIG. 2, illustrated is another embodiment of a full bridge power converter 200 constructed according to the principles of the present invention. The power converter 200 has an input coupled to an input source of electrical power 210 and a DC output coupled to an electrical load R. The power converter 200 includes an isolation transformer 220 having a primary winding Np and two secondary windings Ns1, Ns2. The power converter 200 further includes an inverter 230 that couples an input voltage Vi to the primary winding Np. The power converter 200 further includes first and second output diodes D1, D2, coupled to the secondary windings Ns1, Ns2. The power converter 200 further includes first and second output inductors L1, L2 that are coupled to the first and second diodes D1, D2, respectively. In the illustrated embodiment, the first and second output inductors share a common core. Of course, the common core is not required by the present invention. The power converter 200 further includes an output capacitor 240 coupled across the DC output. The power converter 200 further includes a circuit 260 that allows the power converter 200 to provide an output current at multiple output voltages by alternatively closing and opening an inter-inductor conductive path. In the illustrated embodiment, the circuit 260 includes a contactor SW and first and second freewheeling diodes Df1, Df2. The first and second inductors L1, L2 may thereby be coupled in parallel as required.

The current sharing between the first and second inductors L1, L2 may be maintained by matching the DC resistances associated therewith in conjunction with the voltage drops of the secondary windings Ns1, Ns2 and the first and second output diodes D1, D2. A current mode control of the inverter 230 may further improve current sharing in, for instance, the reduced-voltage mode of operation.

Ripple currents in the first and second output inductors L1, L2 are higher in a reduced-voltage mode. Ideally, the ripple currents should be low to reduce electromagnetic interference (EMI) emission and inductor power loss. The illustrated embodiment, therefore, uses the common core to reduce an AC flux in the core, resulting in lower EMI emission and a reduction of inductor power loss.

The power converter 200 may thus be used in applications that require multiple output voltages, such as telecommunications equipment. In telecommunications applications, the power converter 200 may be designed to produce either 48 volts or 24 volts. The power converter 200 may be configured to a proper voltage, as required, by placing the contactor SW in either an open or closed configuration. Of course, the power converter 200 may be designed to produce other voltages as required by the system it powers.

The power converter 200 may also be used in motor drives or other applications wherein low output voltages and high output currents are required during start. The contactor SW may then be used to select output voltage ranges that optimize the efficiency of the power converter 200.

The concepts of the present invention are equally applicable to systems whereby the DC link voltage (i.e., the input voltage to the power converter) changes significantly. For instance, if the front-end rectifier does not control the DC-link voltage, the power converter operates in the full-voltage mode at a low line condition and in the reduced-voltage mode at a high line condition to produce the same output voltage.

While the present invention has been illustrated and described with respect to a full-bridge power converter, it is understood that other converter topologies (such as asymmetrical half-bridge or forward-flyback power converters) having full-wave rectification in the transformer secondary are well within the broad scope of the present invention. Additionally, exemplary embodiments of the present invention have been illustrated above with reference to specific electronic and magnetic components. Those skilled in the art are aware, however, that components may be substituted (not necessarily with components of the same type) to create desired conditions or accomplish desired results. For instance, multiple components may be substituted for a single component and vice-versa. Similarly, although a magnetic device having a single core and a single primary winding has been illustrated, other configurations, such as magnetic devices having multiple primary windings or multiple cores, may be used to accomplish essentially the same results disclosed by the present invention. For a better understanding of power electronics, power converter topologies, such as the full bridge power converters, see *Principles of Power Electronics*, by J. Kassakian, M. Schlecht and G. Verghese. The aforementioned references are incorporated herein by reference.

Although the present invention has been described in detail, those skilled in the art should understand that they can make various changes, substitutions and alterations herein without departing from the spirit and scope of the invention in its broadest form.

What is claimed is:

1. For use in a power converter having first and second output diodes coupled to a secondary winding of an isolation transformer and first and second output inductors, coupled to said first and second output diodes, respectively, and an output derived from said first and second output inductors and a center tap of said secondary winding, a circuit for allowing said power converter to provide an output current at multiple output voltages, comprising:

a contactor, coupled to a first node between said first output diode and said first output inductor and a second node between said second output diode and said second output inductor, that selectively:

closes to create an inter-inductor conductive path to couple said first and second output inductors in parallel and to allow said power converter to operate at a first output voltage, and opens to break said inter-inductor conductive path and to allow said power converter to operate at a second output voltage lower than said first output voltage; and first and second conductive paths, coupling said center tap to said first node and said second node, respectively, each path including a diode.

2. The circuit as recited in claim 1 wherein said power converter further comprises a snubber circuit coupled to said secondary winding of said isolation transformer.

3. The circuit as recited in claim 1 wherein said power converter further comprises an inverter coupled to a primary winding of said isolation transformer.

4. The circuit as recited in claim 1 wherein said power converter further comprises an output capacitor coupled across said output of said power converter.

5. The circuit as recited in claim 1 wherein said first output voltage is about 48 volts and said second output voltage is about 24 volts.

6. The circuit as recited in claim 1 wherein said first and second output inductors share a common core.

7. For use in a power converter having first and second output diodes coupled to a secondary winding of an isolation transformer and first and second output inductors, coupled to said first and second output diodes, respectively and an output derived from said first and second output inductors and a center tap of said secondary winding, a method of allowing said power converter to provide an output current at multiple output voltages, comprising the steps of:

forming a first conductive path by coupling said center tap via a first diode to a first node between said first output diode and said first output inductor;

forming a second conductive path by coupling said center tap via a second diode to a second node between said second output diode and said second output inductor;

creating an inter-inductor conductive path to couple said first and second output inductors in parallel and to allow said power converter to operate at a first output voltage; and breaking said inter-inductor conductive path to allow said power converter to operate at a second output voltage lower than said first output voltage.

8. The method as recited in claim 7 further comprising the step of operating a snubber circuit coupled to said secondary winding of said isolation transformer.

9. The method as recited in claim 7 wherein said first and second output inductors share a common core.

10. The method as recited in claim 7 further comprising the step of operating an inverter to provide power to a primary winding of said isolation transformer.

11. The method as recited in claim 7 further comprising the step of processing said output current in an output capacitor coupled across said output of said power converter.

12. The method as recited in claim 7 wherein said first output voltage is about 48 volts and said second output voltage is about 24 volts.

13. A power converter, comprising:

an isolation transformer having primary and secondary windings;

first and second output diodes coupled to said secondary winding;

first and second output inductors, coupled to said first and second output diodes, respectively, an output of said power converter derived from said first and second output inductors and a center tap of said secondary winding; and a circuit for allowing said power converter to provide an output current at multiple output voltages, including:
    a contactor, coupled to a first node between said first output diode and said first output inductor and a second node between said second output diode and said second output inductor, that selectively:
        closes to create an inter-inductor conductive path to couple said first and second output inductors in parallel and to allow said power converter to operate at a first output voltage, and
        opens to break said inter-inductor conductive path and to allow said power converter to operate at a second output voltage lower than said first output voltage; and
    first and second conductive paths, coupling said center tap to said first node and said second node, respectively, each path including a diode.

14. The power converter as recited in claim 13 further comprising a snubber circuit coupled to said secondary winding of said isolation transformer.

15. The power converter as recited in claim 13 wherein said first and second output inductors share a common core.

16. The power converter as recited in claim 13 wherein said first output voltage is about 48 volts and said second output voltage is about 24 volts.

17. The power converter as recited in claim 13 further comprising an inverter coupled to said primary winding of said isolation transformer.

18. The power converter as recited in claim 13 further comprising an output capacitor coupled across said output of said power converter.

* * * * *